United States Patent
Kawanishi et al.

(10) Patent No.: US 6,706,411 B2
(45) Date of Patent: Mar. 16, 2004

(54) RUST-PREVENTING LUBRICATED STEEL MATERIALS AND COATING COMPOSITIONS THEREFOR

(75) Inventors: Katsuji Kawanishi, Ibaraki (JP); Junji Matsuda, Kawasaki (JP); Hiroyuki Ito, Kawasaki (JP)

(73) Assignees: Sumitomo Metal Industries, Ltd., Osaka (JP); NOF Corporation, Tokyo (JP)

( * ) Notice: Subject to any disclaimer, the term of this patent is extended or adjusted under 35 U.S.C. 154(b) by 176 days.

(21) Appl. No.: 09/742,345

(22) Filed: Dec. 22, 2000

(65) Prior Publication Data

US 2001/0005549 A1 Jun. 28, 2001

(30) Foreign Application Priority Data

Dec. 24, 1999 (JP) ............................................. 11-368054

(51) Int. Cl.$^7$ ........................... B32B 15/08; B32B 5/16; B32B 27/00; B29C 71/02; H05B 6/02
(52) U.S. Cl. ........................ 428/461; 428/327; 428/421; 428/500; 106/2; 106/14.41; 427/541; 427/544
(58) Field of Search ............................ 106/14.05, 14.13, 106/14.15, 14.41, 14.42; 428/219, 323, 327, 340, 341, 411.1, 421, 457, 461, 500; 427/541, 544

(56) References Cited

U.S. PATENT DOCUMENTS 4,826,902 A 5/1989 Hanabata et al.
5,776,934 A * 7/1998 Lesmann et al. ........... 514/245

FOREIGN PATENT DOCUMENTS

| JP | 60035063 A | * 2/1985 |
| JP | 60-250099 | 12/1985 |
| JP | 1-207397 | 8/1989 |
| JP | 9-296132 | 11/1997 |
| JP | 10-1690 | 1/1998 |

* cited by examiner

Primary Examiner—Paul Thibodeau
Assistant Examiner—Sheeba Ahmed
(74) Attorney, Agent, or Firm—Burns, Doane, Swecker & Mathis, LLP

(57) ABSTRACT

A lubricated steel material has a lubricating film on the steel surface. The film has good press formability, film removability, and blocking resistance, and possesses a high level of rust preventing properties in that it can prevent the steel material from rusting when kept in stacked or coiled conditions with no oil application. The lubricated steel material is produced by coating a steel material with a coating composition comprising from 74% to 97.7% by weight of an acrylic resin having an acid number of from 30 to 150 and a glass transition temperature of from 5 to 90° C., from 2% to 20% by weight of a water repellant, preferably one or more classes selected from the group consisting of carboxylic acid esters, metal soaps, polyethylene fine powder, and fluoroplastic fine powder, and from 0.3% to 6% by weight of an anticorrosive agent which is a mixture of an alkylamidecarboxylic acid or its salt and a nitrogen-containing basic compound, preferably an alkanolamine, followed by drying at a temperature of from 50 to 150° C.

6 Claims, No Drawings

RUST-PREVENTING LUBRICATED STEEL MATERIALS AND COATING COMPOSITIONS THEREFOR

BACKGROUND OF THE INVENTION

The present invention relates to a coating composition for use in lubrication of steel materials which are to be shaped by press-forming, including steel sheets (such as pickled hot-rolled steel sheets, cold-rolled steel sheets, plated steel sheets, and stainless steel sheets) and steel pipes. The present invention also pertains to lubricated steel materials having a lubricating film formed from the coating composition and exhibiting improved rust prevention, particularly when they are kept in stacked or coiled conditions.

A lubricating oil has traditionally been applied in-situ to steel materials such as steel sheets and pipes before they are subjected to press-forming. However, in view of environmental problems occurring during application of a lubricating oil, lubricated steel materials which have a previously-formed organic lubricating film on steel surfaces have recently been used widely in place of in-situ application of a lubricating oil prior to press-forming. The organic lubricating film may be formed on the surface of the steel materials either immediately after the production of the steel materials or at an appropriate subsequent stage prior to press-forming.

A coating composition which has conventionally been used to form the organic lubricating film in the production of lubricated steel materials is normally based oil a drying-type or baking-type film-forming component such as an acrylic resin, epoxy resin, melamine resin, phenolic resin, or urethane resin and it contains one or more lubricants such as fatty acids, fatty acid esters, fatty acid soaps, metallic soaps, alcohols, polyethylene fine powder, graphite, molybdenum disulfide, and fluoroplastic fine powder. See, for example, Unexamined Published Japanese Patent Application No. S60-250099 (1985).

In practical use, it is desired that a coating composition for use in the production of lubricated steel materials form a film having the following various properties required at different stages:

a) lubricity at the press-forming stage;
b) rust prevention so that the film can protect the steel material from rusting throughout the stages after the production of the lubricated steel materials (after formation of the film) and before the removal of the film performed subsequent to press-forming (namely temporary rust prevention rather than permanent rust prevention);
c) film removability so that the film can be removed by degreasing with an alkaline cleaning solution subsequent to press-forming; and
d) blocking resistance so that the film can well withstand blocking, i.e., a sticking phenomenon of contacting films, when lubricated steel materials are kept in stacked or coiled conditions.

As a coating composition which is alleged to be able to form an organic lubricating film having these requirements, Unexamined Published Japanese Patent Application No. H01-207397 (1989) discloses a composition comprising a carboxyl-containing organic polymer, polyethylene glycol, and a water-soluble anticorrosive (anti-rust) agent such as a hydroxybenzotriazole, imidazole, or amino acid. However, the presence of polyethylene glycol in the resulting lubricating film tends to cause the film to be swollen by condensed moisture when kept in a moist atmosphere, thereby leading to blocking.

Regarding a rust-preventive coating composition for use in the production of lubricated steel materials, Unexamined Published Japanese Patent Application No. H09-296132 (1997) discloses a composition comprising a rust-preventive lubricant selected from zinc, calcium, and aluminum salts of phosphoric or molybdic acid. U.S. Pat. No. 4,826,902 discloses a composition comprising a mixture of a sulfonamide-carboxylic acid and a cyclic amine as an anticorrosive agent. Unexamined Published Japanese Patent Application No. H10-1690 (1998) discloses a composition comprising an alkylenesulfonamide-carboxylic acid as an anticorrosive agent.

These coating compositions are primarily intended for improving lubricity during press-forming, and still have some problems with respect to rust prevention. For example, when lubricated steel materials produced by coating with such a composition are stored in stacked or coiled conditions in a corrosive environment, e.g., in a yard in a seaside area or along a heavily traveled road, or shipped on the ocean in the form of a coil of steel sheet, they may undergo rusting. This rusting of lubricated steel materials is particularly prominent when they are kept in stacked or coiled conditions during storage or shipping.

SUMMARY OF THE INVENTION

Thus, there is a need for a coating composition capable of forming on steel materials a lubricating film which is satisfactory with respect to all of press-formability, film removability, blocking resistance, and rust prevention.

It is an object of the present invention to provide a coating composition for use in the production of lubricated steel materials which is capable of forming a lubricating film having satisfactory press-formability, film removability, and blocking resistance and exhibiting good rust prevention even when lubricated steel materials having the coating thereon are kept in stacked or coiled conditions in a corrosive environment.

The present inventors investigated the mechanism of rusting on lubricated steel materials which takes place when the materials are kept in stacked or coiled conditions without application of oil. As a result, it was elucidated that the main mechanism of the rusting begins with condensation of water vapor contained in the atmosphere, the condensation occurring within the interstices formed between adjacent stacked or coiled lubricated steel materials. The lubricating film is injured by the action of the condensed water under a load of the stacked or coiled steel materials and the steel rusting process is accelerated by the action of an electrochemical cell created by the presence of water in the interstices, thereby leading to the formation of rust on the lubricated steel surface.

It has been found that a coating composition based on a particular acrylic resin and containing a particular water repellant and anticorrosive agent can form an organic lubricating film which is effective in preventing the formation of rust caused by the above-described mechanism and which is also satisfactory with respect to other properties such as press-formability, film removability, and blocking resistance.

In one aspect, the present invention is a coating composition for use in the production of lubricated steel materials which comprises:

(A) from 74% to 97.7% by weight of an acrylic resin having an acid number of from 30 to 150 and a glass transition temperature of from 5 to 90° C., (B) from 2% to 20% by weight of a water repellant, preferably one or more classes selected from the group consisting of carboxylic acid esters, metal soaps, polyethylene fine powder, and fluoroplastic fine powder, and (C) from 0.3% to 6% by weight of an anticorrosive agent which is a mixture of an alkylamidecarboxylic acid or its salt and a nitrogen-containing basic compound, preferably an alkanolamine, with the weight percents being based on the total weight of components (A), (B), and (C).

In another aspect, the present invention provides a lubricated steel material having an organic film formed from the coating composition. The present invention also provides a process for the production of lubricated steel materials which comprises applying the coating composition to steel materials to form a wet coating and drying the wet coating at a temperature of from 50 to 150° C.

DESCRIPTION OF PREFERRED EMBODIMENTS

The present coating composition for lubricated steel materials comprises an acrylic resin as a film-forming component, the acrylic resin having an acid number of from 30 to 150 and preferably from 40 to 120, and a glass transition temperature of from 5 to 90° C. and preferably from 10 to 85° C. An acrylic resin having an acid number of less than 30 may result in the formation of a film which cannot be readily removed by degreasing and cleaning with an aqueous alkaline solution so that a part of the film may remain on the steel surface and interfere with the subsequent chemical conversion treatment, which is usually performed prior to paint coating. An acrylic resin having an is acid number of greater than 150 may result in the formation of a film having a decreased ability to prevent rust. An acrylic resin having a glass transition temperature below 5° C. tends to form a film having an increased stickiness and a decreased resistance to blocking. An acrylic resin having a glass transition temperature above 90° C. has a decreased film-forming ability and the resulting film will have deteriorated rust prevention and film removability.

Acrylic resins useful in the present invention are thermoplastic acrylic resins which have conventionally been used in coating compositions and can be prepared by any polymerization technique. Such acrylic resins and their preparations are described in detail, for example, by in the book "Introduction to Synthetic Resins for Coating Compositions" by Kyozo Kitaoka published by Kobunshi Kankokai (Polymer Publisher), Japan in 1974.

The above-described acrylic resins can be prepared by polymerization of predominantly monovalent acrylic monomers selected from α,β-ethylenically unsaturated carboxylic acids and α,β-ethylenically unsaturated carboxylic acid esters which are esters of an α,β-ethylenically unsaturated carboxylic acid with a straight or branched chain alcohol containing 1 to 25 carbon atoms. Specific examples of these monomers include acrylic acid and methacrylic acid (esters of these two acids being hereinafter referred to as (meth) acrylates collectively), sorbic acid, itaconic acid, maleic acid, fumaric acid, methyl (meth)acrylate, propyl (meth) acrylate, butyl (meth)acrylate, isobutyl (meth)acrylate, 2-ethylhexyl (meth)acrylate, hexyl (meth)acrylate, lauryl (meth)acrylate, stearyl (meth)acrylate, 2-hydroxyethyl (meth)acrylate, 2-hydroxypropyl (meth)acrylate, glycidyl (meth)acrylate, dimethylaminopropyl (meth)acrylate, and the like.

Generally, a mixture of two or more monomers consisting of at least one α,β-ethylenically unsaturated carboxylic acid and at least one α,β-ethylenically unsaturated carboxylic acid ester is used and polymerized by a conventional polymerization technique, such as solution polymerization or emulsion polymerization. A polymer having an acid number in the range of from 30 to 150 can be obtained by adjusting the proportion of the unsaturated carboxylic acid in the monomer mixture. Similarly, a polymer having a glass transition temperature between 5° C. and 90° C. can be obtained by adjusting the class and proportion of each of the carboxylic acid and carboxylic acid ester monomers. The resulting polymer or acrylic resin may be neutralized with ammonia or an amine.

The water repellant which is used in the coating compositions according to the present invention is selected so as not to interfere with the film-forming properties and film removability of the acrylic resin and the rust-preventing properties of the anticorrosive agent. Preferable water repellants which can be used in the present invention are one or more classes selected from carboxylic acid esters, metal soaps, polyethylene fine powder, and fluoroplastic fine powder. Although these water repellants are also known to be effective as lubricants, it is not necessary for the water repellant used in the present invention to exhibit lubricating properties.

Carboxylic acid esters useful as a water repellant are alkyl esters of an aliphatic or aromatic monocarboxylic acid or a polycarboxylic acid such as di- or tricarboxylic acid. Specific examples of such carboxylic acid esters include butyl stearate, di-2-ethylhexyl phthalate, diheptyl phthalate, di-n-octyl phthalate, dinonyl phthalate, diisodecyl phthalate, ditridecyl phthalate, di-2-ethylhexyl adipate, trioctyl trimellitate, ethylene glycol distearate, glycerol tricaprylate, trimethylolpropane tristearate, and the like.

Useful metal soaps include aluminum stearate, calcium stearate, zinc stearate, magnesium stearate, and the like. Exemplary of fluoroplastics are polytetrafluoroethylene resins and polyvinylidene fluoride resins. The average particle diameter of the polyethylene fine powder and fluoroplastic fine powder is not critical, but it is preferably on the order of from 0.1 to 10 $\mu$m.

The present coating composition for lubricated steel materials contains, as an anticorrosive agent, a mixture of an alkylamidecarboxylic acid or its salt and a nitrogen-containing basic compound. If a sulfonamidecarboxylic acid described in U.S. Pat. No. 4,826,902 is used in place of the alkylamidecarboxylic acid, it is not possible to bring about the high level of rust preventing properties which are attainable in the present invention. The mixing ratio of the alkylamidecarboxylic acid or its salt to the nitrogen-containing basic compound is preferably in the range of from 2.1 to 1:5 by molar ratio.

The alkylamidecarboxylic acid that is one component of the anticorrosive agent is an amide prepared by reacting a fatty acid containing from 6 to 22 carbon atoms with an aminocarboxylic acid and/or lactam.

The fatty acid having 6–22 carbon atoms includes hexanoic acid, 4-methylpentanoic acid, 2-ethylbutanoic acid, 2,2-dimethylbutanoic acid, heptanoic acid, octanoic acid, nonanoic acid, decanoic acid, undecanoic acid, dodecanoic acid, tetradecanoic acid, hexadecanoic acid, heptadecanoic acid, octadecanoic acid, eicosanoic acid, docosanoic acid, oleic acid, erucic acid, 2,4-hexadienoic acid, 9,12-octadecadienoic acid, 3,5,5-trimethylhexanoic acid, and the like. The alkyl chain of the fatty acid may be either straight or branched, but a branched alkyl chain is preferable. The aminocarboxylic acid includes aminoacetic acid, N-methylaminoacetic acid, 2-aminopropionic acid, 3-aminopropionic acid, 2-aminobutyric acid, 3-aminobutyric acid, 4-aminobutyric acid, and the like. The lactam includes azetidinone, pyrrolidone, ε-caprolactam, and the like.

The alkylamidecarboxylic acid component of the anticorrosive agent may be in the form of a carboxylate salt by reacting with a suitable base in order to increase its water solubility. The carboxylate salt may be a sodium salt, potassium salt, ammonium salt, alkanolamine salt, or the like, The nitrogen-containing basic compound that is the other component of the anticorrosive agent may be an ordinary amine, but preferably it is an alkanolamine in view of the press formability, blocking resistance, film removability, and rust prevention of the resulting coating composition. Useful alkanolamines include monoethanolamine, diethanolamine, triethanolamine, monopropanolamine, dipropanolamine, tripropanolamine, dimethylethanolamine, diethylethanolamine, ethyldiethanolamine, butyldiethanolamine, and the like.

The alkylamidecarboxylic acid and the alkanolamine, which serve together as an anticorrosive agent, may be added to the coating composition separately. Alternatively, a commercially available mixture of these two components may be used. An example of such a commercially available mixture is Phostacore IS/1 sold by Clariant Japan.

The above-described acrylic resin, water repellant, and anticorrosive agent are present in the present coating composition for lubricated steel materials in the following proportions based on the total weight of these three ingredients:

(A) from 74% to 97.7% by weight of the acrylic resin,
(B) from 2% to 20% by weight of the water repellant, and
(C) from 0.3% to 6% by weight of the anticorrosive agent.

If the coating composition contains the water repellant in a proportion of less than 2% by weight, it will not give rise to sufficient water repellence, resulting in a loss in rust prevention and press formability. The effect of the water repellant will saturate when it is present in the proportion of 20% by weight, and a higher proportion will be disadvantageous from the standpoint of economy since it will not bring about further improvement in water repellence. The proportion of the water repellant is preferably in the range of from 5% to 15% by weight.

Regarding the anticorrosive agent which is a mixture of an alkylamidecarboxylic acid and a nitrogen-containing basic compound, when the coating composition contains the agent in a proportion of less than 0.3% by weight, it will not give rise to sufficient rust preventing properties. The presence of more than 6% by weight of the anticorrosive agent will adversely affect the press formability of the coating composition. Preferably the proportion of the anticorrosive agent is in the range of from 1% to 4% by weight.

The anticorrosive agent used in the present coating composition is a mixture of an alkylamidecarboxylic acid and a nitrogen-containing basic compound. Besides this anticorrosive agent, an additional known anticorrosive agent, such as a benzotriazole or sulfonamidecarboxylic acid, may be used so long as it does not significantly interfere with the effects of the present coating composition. Moreover, the coating composition may contain one or more of various known additives to coating compositions such as a coloring agent, surfactant, antifoaming agent, pH adjusting agent, and the like. In such cases, however, the class and amount of such an additive should be selected so that it does not have a significant adverse effect on the properties of the coating composition.

In order to produce a lubricated steel material, the coating composition according to the present invention may be used after being diluted with water or a solvent to a concentration suitable for application, if necessary. The diluted coating composition may be applied to a steel material by a conventional coating technique such as dipping, roll coating, curtain flow coating, spraying, electrostatic coating, or electrodeposition coating, and the resulting wet coating may be dried by heating with hot-air or by irradiation with actinic radiation to form a solid organic film on the steel surface. In the cases where the acrylic resin is prepared by emulsion polymerization or solution polymerization, the resulting resin solution or emulsion may be used to prepare a coating composition ready for use (having a concentration suitable for application) by adding thereto the water repellant and anticorrosive agent and, if necessary, a minor amount of one or more optional additives, followed by adjustment of concentration, if necessary.

The coating weight of the coating composition on the steel surface is preferably in the range of from 0.2 to 6.0 $g/m^2$ and more preferably from 0.5 to 3.0 $g/m^2$. A coating weight of less than 0.2 $g/m^2$ will result in the formation of a film having insufficient lubricity and rust prevention. A coating weight of greater than 6.0 $g/m^2$ does not give rise to further appreciable improvement in lubricity and rust prevention and adds to the costs of the lubricated steel material.

The wet coating formed from the present coating composition is preferably dried at a temperature of from 50 to 150° C. If the drying temperature is lower than 50° C., the drying time required to form a dry film having satisfactory properties is excessively prolonged, thereby adversely affecting operating efficiency and costs. A drying temperature above 150° C. adds to drying costs.

The coating composition according to the present invention, when used to lubricate a steel material, forms on the steel surface an organic film based on the acrylic resin which contains the water repellant and anticorrosive agent therein. The organic film has lubricity sufficient to permit the steel material to be press-formed with no oil application. The lubricity is primarily attributable to the acrylic resin film itself, but some classes of water repellants may contribute to the lubricity.

The organic film formed from the coating composition has good film removability and can be readily removed by degreasing or cleaning with an aqueous alkaline solution. Accordingly, the coating composition does not interfere with subsequent chemical conversion treatment such as zinc phosphate treatment, which is performed prior to paint coating, thereby making it possible to form a satisfactory chemical conversion coating on the cleaned steel surface.

The organic film also possesses good resistance to blocking. Furthermore, the film can provide the steel material with excellent rust-preventing properties in that it can protect the steel material from rusting when the lubricated steel material is stored in stacked or coiled conditions for a prolonged period without application of oil. Therefore, the steel material can be prevented from rusting during production of the lubricated steel material, during storage or shipping, during press forming, and after press forming and before removal of the film.

The following example is presented to further illustrate the present invention. It is to be considered in all respects as illustrative and not restrictive.

EXAMPLE

Various acrylic resins having monomeric compositions and properties shown in Table 1 (in which Tg indicates glass transition temperature) were synthesized.

These acrylic resins were used to prepare coating compositions containing the ingredients shown in Table 2 in a conventional manner for paint preparation. The coating compositions were in the form of aqueous diluted compositions having a 25 wt % solids content so as to give a concentration suitable for application. Table 2 indicates the proportions of the water repellant and anticorrosive agent in weight percent based on the total amounts of the resin, water repellant and anticorrosive agent, with the acrylic resin constituting the balance of the total amounts, which was taken as 100%. Each diluted coating composition had a pH of 8.0, which was adjusted by addition of an aqueous ammonia.

The aqueous diluted coating composition was applied with a bar coater to one surface of a 0.8 mm-thick cold-rolled steel sheet, which had been cleaned by degreasing treatment, to give a coating weight of 3 g/m² after drying. The resulting wet coating was dried by heating for 10 minutes in a hot-air oven at a temperature shown in Table 2, thereby producing a lubricated steel sheet having a lubricating dry film on one surface. The lubricated steel sheet was tested for press formability by cup drawing (to evaluate lubricity), film removability with an alkaline degreasing and cleaning solution, blocking resistance, and rust prevention in stacked conditions in the following manner. The results of these tests are also shown in Table 2.

TESTING METHODS

1) Press Formability

Press formability was tested by cup drawing according to the Swift cup test. Blanks of the lubricated steel sheet to be tested having different diameters were subjected to cup drawing with a punch having a diameter of 33.0 mm at a holding pressure of 1000 kg/cm². The maximum blank diameter that could be successfully drawn without fracture was determined to calculate the limiting draw ratio (LDR) of the lubricated steel sheet (A) by the following equation:

Limiting Draw Ratio=Maximum Blank Diameter/Punch Diameter

The limiting draw ratio (LDR) of a bare steel sheet having no coating (B) was determined in the same manner. The press formability was evaluated based on the ratio A/B, i.e., the ratio of LDR of the test steel sheet to that of the bare steel sheet in the following manner:

X: A/B<1.0

Δ: A/B=1.0–1.1

O: A/B >1.1

A=LDR of lubricated steel sheet; B=LDR of bare steel sheet.

2) Film Removability

The coated surface of a test piece of the lubricated steel sheet was sprayed for degreasing with a 2% aqueous solution of an alkaline degreasing and cleaning solution (Fine Cleaner FC 4326 sold by Japan Parkerizing) for 5 seconds at a temperature of 60–70° C. and a spray pressure of 1 kg/cm². The degreased steel surface was visually observed for the degree of water repellence, which indicates the presence of remaining lubricated film on the surface, to evaluate film removability as follows:

X: water repellence observed on the entire surface,

Δ: water repellence observed partly on the surface,

O: no water repellence observed,

3) Blocking Resistance

Two test pieces of the lubricated steel sheet each measuring 0.8×70×150 mm were stacked on one another with their organic lubricating films facing and contacting each other and were aged (left) for one minute at 50° C. under a loading of 67 kg/cm², then for 16 hours at 40° C. under a light loading of 500 g/m², and finally for 50 days at room temperature under no loading. Thereafter, the two steel sheets were pulled apart. The blocking resistance was evaluated based on the degree of sticking of the films found at the time of pulling apart the steel sheets in the following manner:

X: considerable sticking,

Δ: slight sticking,

O: no sticking.

4) Rust Prevention

Two test pieces of the lubricated steel sheet each measuring 0.8×70×150 mm were stacked on one another with their organic lubricating films facing and contacting each other and were aged for 48 hours at 50° C. under a loading of 50 kg/cm². Before stacking, a drop of pure water was placed between the two steel sheets. At the end of the aging period, the two test steel sheets were pulled apart and the appearing coated surfaces were observed for rusting to evaluate the rust prevention of the test pieces in the following manner:

X: considerable rusting,

Δ: slight rusting,

O: no rusting.

TABLE 1

| Resin No. | Monomeric Composition (wt %)[1] | | | | | | Properties | |
| --- | --- | --- | --- | --- | --- | --- | --- | --- |
| | AA | MAA | MMA | OA | BA | EHMA | AN[2] | Tg/° C. |
| TI[3] | | | | | | | | |
| 1 | 8 | | 52 | 40 | | | 62 | 12 |
| 2 | 8 | | 52 | | 40 | | 62 | 20 |
| 3 | 8 | | 52 | | 30 | 10 | 62 | 34 |
| 4 | | 10 | 70 | | 20 | | 65 | 64 |
| 5 | 8 | | 52 | | | 40 | 62 | 83 |
| CO[4] | | | | | | | | |
| 6 | | 10 | 30 | | 60 | | 65 | −5* |
| 7 | | 2 | 48 | | 50 | | 13* | 5 |
| 8 | 22 | | 38 | | 40 | | 171* | 20 |
| 9 | 8 | | 92 | | | | 62 | 105* |

[1]AA = Acrylic Acid, MAA = Methacrylic Acid, MMA = Methyl Methacrylate, OA = Octyl Acrylate, BA = Butyl Acrylate, EHMA = Ethylhexyl Methacrylate,
[2]AN = Acid Number,
[3]TI = This Invention,
[4]CO = Comparative,
*Properties outside the range defined herein.

TABLE 2

| Run No. | Resin No. | Water Repellant[1] | | Anticorrosive agent[2] | | Drying Temp/ ° C. | Press Formability | Film Removability | Blocking Resistance | Rust Prevention |
| --- | --- | --- | --- | --- | --- | --- | --- | --- | --- | --- |
| | | Type | wt % | Type | wt % | | | | | |
| 1 | 1 | Cast | 9.0 | A | 2.6 | 100 | O | O | O | O |
| 2 | 2 | Cast | 9.0 | A | 2.6 | 100 | O | O | O | O |

TABLE 2-continued

| Run No. | Resin No. | Water Repellant[1] Type | Water Repellant[1] wt % | Anticorrosive agent[2] Type | Anticorrosive agent[2] wt % | Drying Temp/ °C. | Press Formability | Film Removability | Blocking Resistance | Rust Prevention |
|---|---|---|---|---|---|---|---|---|---|---|
| 3 | 2 | Cast | 9.0 | A | 3.9 | 100 | ○ | ○ | ○ | ○ |
| 4 | 2 | Cast | 9.0 | A | 5.1 | 100 | ○ | ○ | ○ | ○ |
| 5 | 3 | Cast | 9.0 | A | 2.6 | 100 | ○ | ○ | ○ | ○ |
| 6 | 4 | Cast | 9.0 | B | 3.9 | 100 | ○ | ○ | ○ | ○ |
| 7 | 5 | DOP | 9.0 | A | 2.6 | 100 | ○ | ○ | ○ | ○ |
| 8 | 2 | PE | 9.0 | A | 2.6 | 100 | ○ | ○ | ○ | ○ |
| 9 | 2 | PVdF | 9.0 | A | 2.6 | 100 | ○ | ○ | ○ | ○ |
| 10 | 1 | Cast | 9.0 | A | 2.6 | 50 | ○ | ○ | ○ | ○ |
| 11 | 1 | Cast | 9.0 | A | 2.6 | 150 | ○ | ○ | ○ | ○ |
| 12 | 1 | Cast | 9.0 | C* | 1.3 | 100 | ○ | ○ | ○ | Δ |
| 13 | 2 | Cast | 9.0 | A | 7.8* | 100 | Δ | ○ | ○ | ○ |
| 14 | 2 | — | 0* | A | 2.6 | 100 | Δ | ○ | ○ | Δ |
| 15 | 6* | Cast | 9.0 | A | 2.6 | 100 | ○ | ○ | X | ○ |
| 16 | 7* | Cast | 9.0 | A | 3.9 | 100 | ○ | X | ○ | Δ |
| 17 | 8* | DOP | 9.0 | A | 2.6 | 100 | ○ | ○ | ○ | X |
| 18 | 9* | DOP | 9.0 | A | 3.9 | 100 | ○ | X | ○ | Δ |
| 19 | 2 | Cast | 9.0 | — | 0* | 100 | ○ | ○ | ○ | X |
| 20 | 2 | Cast | 30* | A | 10* | 100 | X | Δ | ○ | Δ |
| 21 | | Commercially available rust-preventing oil[3] | | | | | X | ○ | ○ | ○ |

[1]Cast = Calcium Stearate, PE = Polyethylene Fine Powder,
DOP = di-n-octyl phthalate, PVdF = Fluoroplastic Fine Powder
[2]A = 1:3 mixture (by molar ratio) of 3,3,5-trimethylhexylamidehexanoic acid and triethanolamine
B = 1:2 mixture (by molar ratio) of 3,3,5-trimethylhexylamidehexanoic acid and diethanolamine
C = equimolar mixture of arylsulfonamideacetic acid and N-methylmorpholine
[3]Oil Coat SK sold by Idemitsu
*Conditions outside the present invention As can be seen from Table 2, the coating compositions according to the present invention could produce lubricated steel sheets having satisfactory press formability, film removability, blocking resistance, and rust prevention. In particular, the test for rust prevention was performed under severe corrosive conditions for lubricated steel sheets in which test pieces with no oil application were kept in a stacked condition under a heavy load at an elevated temperature (50° C.) with water being placed between the stacked test pieces. No rusting or corrosion occurred after 48 hours under such corrosive conditions, indicating that the lubricated steel sheet tested had a high level of rust preventing properties.

The anticorrosive agent C used in Run No. 12 shown in Table 2 corresponds to an anticorrosive agent used in the coating compositions disclosed in U.S. Pat. No. 4,826,902. It is stated in that patent that a lubricating film containing the anticorrosive agent could prevent a steel sheet from rusting when test pieces of a lubricated steel sheet having the film were kept in stacked conditions for 24 hours after oil was applied to the test pieces. However, when tested for rust prevention under more corrosive conditions in this example, the anticorrosive agent C could not prevent rusting as shown in Run No. 12. Thus, it is apparent that the coating composition according to the present invention has significantly improved rust preventing properties with respect to the prior art composition disclosed in the above-mentioned patent.

In those comparative examples where the acid number or glass transition temperature of the acrylic resin was outside the range defined herein or where the water repellant or anticorrosive agent was not added, at least one of the properties tested deteriorated. The use of a commercially available rust-preventing oil resulted in poor press formability.

It is apparent from this example that lubricated steel sheets having a lubricating film formed from a coating composition according to the present invention are significantly improved in rust preventing properties in stacked or coiled conditions, properties which were difficult to improve with prior art lubricated steel sheets, while they possess good press formability (lubricity), film removability, and blocking resistance.

What is claimed is:

1. A coating composition for use in the production of lubricated steel materials which comprises:
    (A) from 74% to 97.7% by weight of an acrylic resin having an acid number of from 30 to 150 and a glass transition temperature of from 5 to 90° C.,
    (B) from 2% to 20% by weight of a water repellant, and
    (C) from 0.3% to 6% by weight of an anticorrosive agent which is a mixture of an alkylamidecarboxylic acid or its salt and a nitrogen-containing basic compound, the weight percents being based on the total weight of components (A), (B), and (C), wherein the alkylamidecarboxylic acid is formed by reacting a fatty acid containing 6 to 22 carbon atoms with an aminocarboxylic acid and/or lactam.

2. The coating composition according to claim 1 wherein the water repellant is one or more classes selected from the group consisting of carboxylic acid esters, metal soaps, polyethylene powder, and fluoroplastic powder.

3. The coating composition according to claim 1 wherein the nitrogen-containing basic compound is an alkanolamine.

4. A lubricated steel material having an organic film formed from the coating composition according to claim 1.

5. The lubricated steel material according to claim 4 wherein the organic film has a weight in the range of from 0.2 to 6.0 g/m².

6. A process for the production of lubricated steel materials which comprises applying the coating composition according to claim 1 to a steel material to form a wet coating and drying the wet coating at a temperature of from 50 to 150° C.

* * * * *